(12) United States Patent
Tappij-Gielen

(10) Patent No.: US 10,112,434 B2
(45) Date of Patent: Oct. 30, 2018

(54) SHADOW IMAGE SECURITY FEATURE

(75) Inventor: Michael Tappij-Gielen, 's-Gravendeel (NL)

(73) Assignee: Entrust Datacard Corporation, Shakopee, MN (US)

(*) Notice: Subject to any disclaimer, the term of this patent is extended or adjusted under 35 U.S.C. 154(b) by 1020 days.

(21) Appl. No.: 12/988,690

(22) PCT Filed: Dec. 29, 2008

(86) PCT No.: PCT/US2008/088402
§ 371 (c)(1),
(2), (4) Date: Oct. 20, 2010

(87) PCT Pub. No.: WO2009/139800
PCT Pub. Date: Nov. 19, 2009

(65) Prior Publication Data
US 2011/0037247 A1    Feb. 17, 2011

Related U.S. Application Data

(60) Provisional application No. 61/053,756, filed on May 16, 2008.

(51) Int. Cl.
*B42D 25/435* (2014.01)
*B42D 25/21* (2014.01)
(Continued)

(52) U.S. Cl.
CPC .......... *B42D 25/435* (2014.10); *B32B 5/142* (2013.01); *B32B 27/08* (2013.01); *B32B 27/304* (2013.01);
(Continued)

(58) Field of Classification Search
CPC .......... B42D 15/00; B42D 15/10; G09C 3/00
(Continued)

(56) References Cited

U.S. PATENT DOCUMENTS

| 2,395,804 A | 3/1946 | De Gruchy |
| 3,204,354 A | 9/1965 | Berger |

(Continued)

FOREIGN PATENT DOCUMENTS

| CA | 2421643 | 1/2004 |
| CH | 701875 | 3/2011 |

(Continued)

OTHER PUBLICATIONS

International Search Report for application No. PCT/US2008/088402. dated Aug. 7, 2009 (3 pages).
(Continued)

*Primary Examiner* — Justin V Lewis
(74) *Attorney, Agent, or Firm* — Hamre, Schumann, Mueller & Larson, P.C.

(57) ABSTRACT

A security document created by laminating a metalized foil between transparent layers, and modifying the outside of the foil to form a base color of the document, while leaving a window area formed by an unmodified portion of the foil. A laser is then used to ablate at least a portion of the unmodified portion of the foil in the window area to create an image. The window area includes the laser ablated image formed therein. The resulting image is transparent, with the image being visible from a front of the security document and visible from a rear of the security document.

7 Claims, 4 Drawing Sheets

(51) Int. Cl.
| | |
|---|---|
| *B42D 25/309* | (2014.01) |
| *B42D 25/318* | (2014.01) |
| *B42D 25/373* | (2014.01) |
| *B32B 27/08* | (2006.01) |
| *B32B 27/36* | (2006.01) |
| *B41M 3/14* | (2006.01) |
| *B41M 5/24* | (2006.01) |
| *B42D 25/41* | (2014.01) |
| *B42D 25/00* | (2014.01) |
| *B32B 5/14* | (2006.01) |
| *B32B 27/30* | (2006.01) |

(52) U.S. Cl.
CPC ............ *B32B 27/36* (2013.01); *B32B 27/365* (2013.01); *B41M 3/14* (2013.01); *B41M 5/24* (2013.01); *B42D 25/00* (2014.10); *B42D 25/21* (2014.10); *B42D 25/309* (2014.10); *B42D 25/318* (2014.10); *B42D 25/373* (2014.10); *B42D 25/41* (2014.10); *B32B 2255/10* (2013.01); *B32B 2255/205* (2013.01); *B32B 2307/402* (2013.01); *B32B 2307/412* (2013.01); *B32B 2307/414* (2013.01); *B32B 2307/75* (2013.01); *B32B 2425/00* (2013.01); *B42D 2035/50* (2013.01)

(58) Field of Classification Search
USPC ................ 283/72, 74, 75, 77, 82, 83, 86
See application file for complete search history.

(56) References Cited

U.S. PATENT DOCUMENTS

| | | |
|---|---|---|
| 3,755,925 A | 9/1973 | Annenberg |
| 3,758,970 A | 9/1973 | Annenberg |
| 3,874,979 A | 4/1975 | Hannon |
| 4,175,775 A | 11/1979 | Kruegle |
| 4,222,662 A | 9/1980 | Kruegle |
| 4,304,809 A | 12/1981 | Moraw et al. |
| 4,318,554 A | 3/1982 | Anderson et al. |
| 4,563,024 A | 1/1986 | Blyth |
| 4,596,409 A | 6/1986 | Holbein |
| 4,766,026 A | 8/1988 | Lass et al. |
| 4,894,110 A | 1/1990 | Lass et al. |
| 5,083,850 A | 1/1992 | Mallik et al. |
| 5,085,514 A | 2/1992 | Mallik et al. |
| 5,116,548 A | 5/1992 | Mallik et al. |
| 5,145,212 A | 9/1992 | Mallik |
| 5,298,922 A | 3/1994 | Merkle et al. |
| 5,380,044 A | 1/1995 | Aitkens et al. |
| 5,388,862 A * | 2/1995 | Edwards .................. 283/82 |
| 5,421,619 A | 6/1995 | Dyball |
| 6,036,807 A | 3/2000 | Brongers |
| 6,066,437 A | 5/2000 | Kosslinger |
| 6,082,778 A | 7/2000 | Solmsdorf |
| 6,444,377 B1 | 9/2002 | Jotcham et al. |
| 6,644,552 B1 | 11/2003 | Herslow |
| 6,752,432 B1 | 6/2004 | Richardson |
| 7,063,264 B2 | 6/2006 | Bi et al. |
| 7,140,540 B2 | 11/2006 | Haddock |
| 7,202,970 B1 | 4/2007 | Maher et al. |
| 2005/0161512 A1 | 7/2005 | Jones et al. |
| 2005/0230959 A1 | 10/2005 | Nemeth |
| 2006/0138009 A1 | 6/2006 | Bozkurt |
| 2006/0175824 A1 | 8/2006 | Giori et al. |
| 2006/0251869 A1 | 11/2006 | Herslow |
| 2007/0085337 A1 | 4/2007 | Endres et al. |
| 2007/0089831 A1 | 4/2007 | Florentino et al. |
| 2007/0102920 A1 | 5/2007 | Daoshen et al. |
| 2007/0246933 A1 * | 10/2007 | Heim .................... B42D 25/29 283/98 |
| 2008/0284157 A1 * | 11/2008 | Muke .................... B41M 3/14 283/86 |
| 2009/0315316 A1 * | 12/2009 | Staub et al. .................... 283/72 |
| 2009/0315318 A1 | 12/2009 | Jones et al. |

FOREIGN PATENT DOCUMENTS

| | | | |
|---|---|---|---|
| EP | 0012375 A2 | 6/1980 | |
| GB | 2111910 | 7/1983 | |
| WO | 2005/043254 | 5/2005 | |
| WO | 2005/053968 A1 | 6/2005 | |
| WO | 2005/062692 A2 | 7/2005 | |
| WO | WO 2006102700 A1 * | 10/2006 | .............. B41M 3/14 |
| WO | WO 2008012061 A2 * | 1/2008 | |

OTHER PUBLICATIONS

Written Opinion of the International Searching Authority for application No. PCT/US2008/088402, dated Aug. 7, 2009 (4 pages).
"Foil Prelam Product Line," CompoSecure LLC, undated (2 pages).
"Prelam Lite Product Line (Buffered Polyester)," CompoSecure LLC, undated (2 pages).
"PC Composite Prelam Specification Sheet (Laser Engravable)," CompoSecure LLC, Oct. 26, 2005 (1 page).
"CompoSecure Prelam Products versus Brand X Test Summary," CompoSecure, undated (1 page).
"Foil Prelam Specification Sheet (Holograms and Diffraction Foil)," CompoSecure LLC, Apr. 29, 2005 (1 page).
"Security Features for Plastic Identification Cards." CompoSecure, Apr. 6, 2001 (4 pages).
"Polycarbonate Composite Prelam Product Line." CompoSecure, Oct. 26, 2005 (2 pages).
Extended European Search Report for EP Application No. 13183243. 8, dated Jan. 7, 2014, pp. 1-5.

* cited by examiner

SHADOW IMAGE SECURITY FEATURE

PRIORITY INFORMATION

This application is being filed as a PCT International Application in the name of DataCard Corporation and claims the benefit of U.S. Provisional Patent Application 61/053,756 filed May 16, 2008 and entitled "SHADOW IMAGE SECURITY FEATURE," which is incorporated by reference in its entirety.

FIELD

This disclosure relates to a security feature useable on identification documents, such as plastic and composite cards including identification cards, credit and debit cards, and the like, as well as passports. More particularly, this disclosure relates to a shadow image security feature that is formed on an identification document.

BACKGROUND

Identification documents such as identification cards, credit and debit cards, and the like, and passports, are personalized with information concerning the intended holder of the identification document and then issued to the intended holder. Personalization and issuance are typically handled by government agencies, credit card companies, or entities authorized to handle the personalization and issuance process.

As part of the personalization and issuance process, the identification documents can undergo a number of personalization procedures, including printing, photoprinting, magnetic stripe and/or chip encoding, embossing, lamination of protective laminates, and other known procedures.

A number of security measures have been implemented in order to prevent fraudulent production of identification documents and theft of identification documents during personalization and issuance, as well as prevent fraudulent use of identification documents once issued.

Further improvements to security measures to prevent fraudulent production of identification documents and theft of identification documents, as well as prevent fraudulent use of identification documents once issued, are needed.

SUMMARY

A security feature useable on identification documents including identification cards, driver's licenses, credit and debit cards, and the like, as well as passports, that will prevent counterfeiting, forgery or tampering with the document. If an attempt is made to alter the document, defects will show that can be easily recognized when the document is presented at a point of inspection.

A security document is created by laminating a metalized foil between transparent layers, and modifying the outside of the foil to form a base color of the document, while leaving a window area formed by an unmodified portion of the foil. A laser is then used to ablate at least a portion of the unmodified portion of the foil in the window area to create an image. The window area includes the laser ablated image formed therein. The resulting image is transparent, with the image being visible from a front of the security document and visible from a rear of the security document.

DRAWINGS

DETAILED DESCRIPTION

Figure 1:
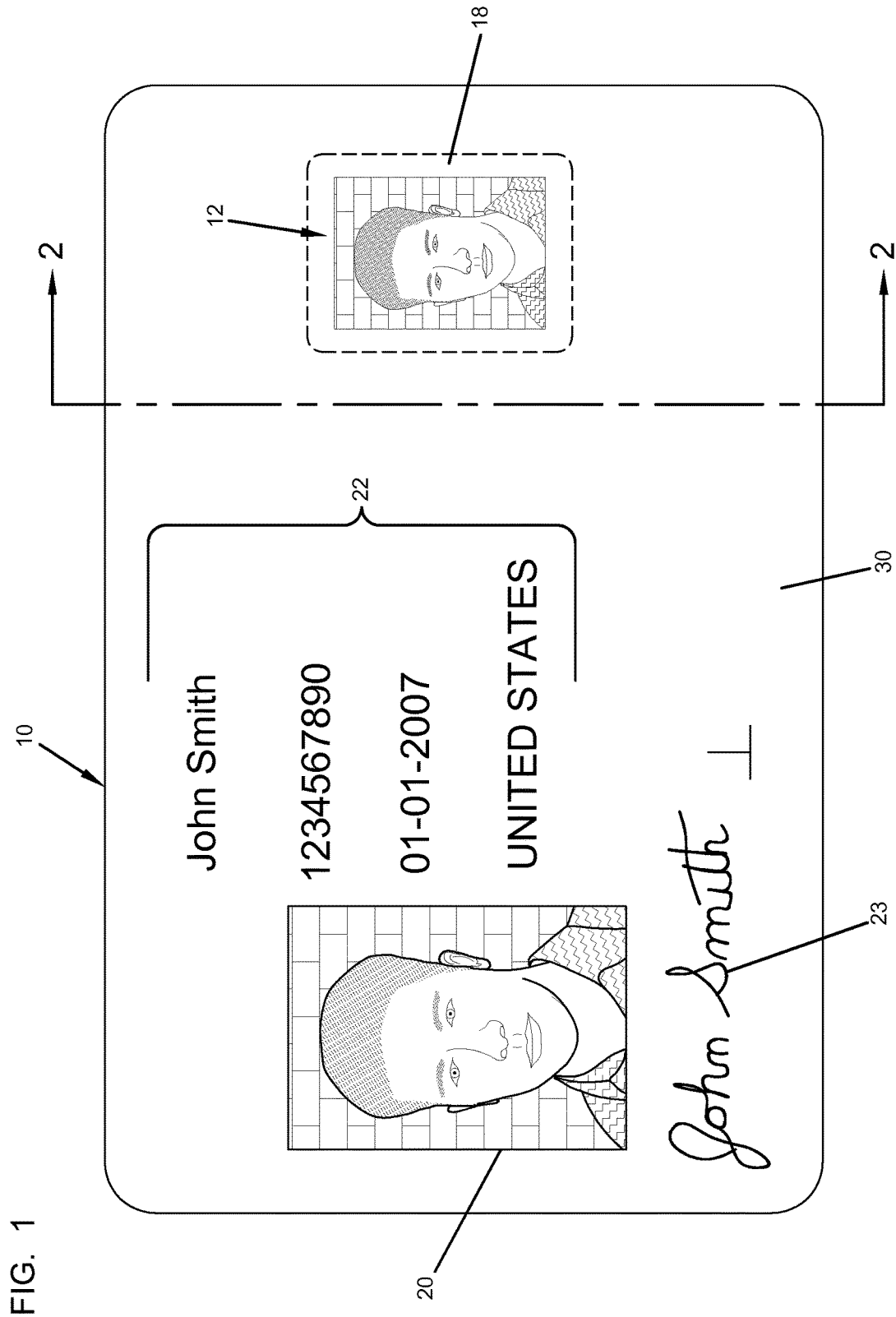
FIG. 1 is a view of the front side of an identification document that includes a shadow image security feature.

FIG. 1 illustrates an identification document 10 with a shadow image security feature 12. The identification document 10 can be any identification document that has personalization, for example a photograph, or other personal information. Examples of identification documents on which the shadow image security feature can be used include plastic (e.g. PVC, PET, polycarbonate) or composite cards, for example identification cards, credit and debit cards, and the like, and passports. To facilitate the description, the identification document 10 will hereinafter be described as being an identification card or just a card.

Figure 2:
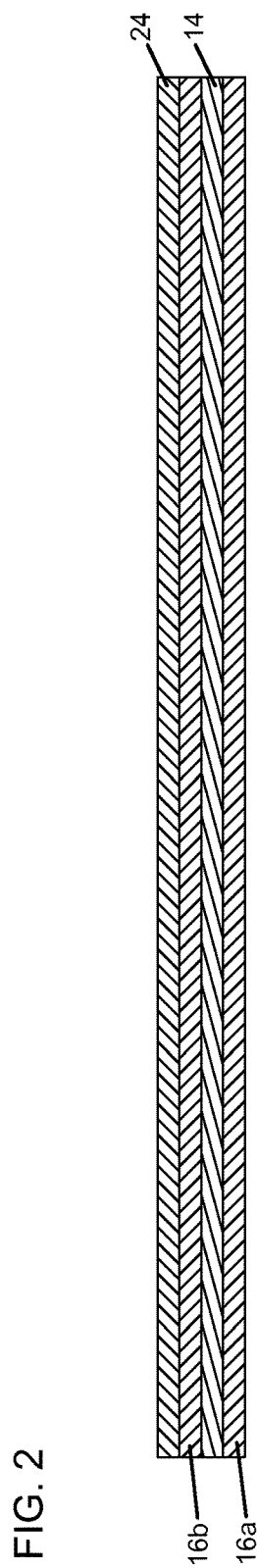
FIG. 2 is a cross-sectional view of the identification document taken along line 2-2 of FIG. 1.

With reference to FIG. 2, in constructing the card 10, a metalized foil 14 that is receptive to a laser source is laminated between transparent layers 16a, 16b of the material that is selected for the secure document. A suitable metalized foil 14 is available from Crown Roll Leaf, Inc. of Paterson, N.J. The foil 14 can have a plain or unique color but can also be provided with a holographic effect. The transparent layers 16a, 16b can be any material suitable for forming a card or other identification document, for example PVC, PET, or polycarbonate. The layers 16a, 16b can also be provided with colors, patterns, holographic features, etc. U.S. Patent Publication 2006/0251869, which is incorporated herein by reference, discloses examples of suitable thicknesses for the layers 16a, 16b.

After the foil 14 is laminated with the transparent layers 16a, 16b, the outside surface of the foil 14 can be printed with a suitable printing technique, for example lithographic or screen printing, to get the base color, for example white, for the card 10. The area where the shadow image 12 will be created is not overprinted which creates a "window" area 18 which has the original color of the foil 14.

There is no limitation in size or shape of the window area 18 and the subsequent shadow image 12 other than the size of the card. Therefore, although the window area 18 is illustrated as being rectangular, the broken lines of the window area 18 imply that other shapes and sizes are possible.

The thus formed card "core" is then personalized as with any conventional card. For example, in the illustrated embodiment, the core includes personalization such as a photograph 20, for example a color photograph, of the intended card holder applied thereto. The photograph 20 can be printed onto the outer surface of the layer 16b using known printing techniques, for example dye sublimation, or by an image transfer technique in which the photo is first printed onto a transfer layer which is then laminated to the card surface. Alternatively, the photograph can be applied to the foil layer 14. Additional information 22, for example further personalization such as the card holder's name, a unique identifier such as an account or serial number, the card holder's birthdate, or the card holder's signature 23, or general information such as the card holder's citizenship, can also be applied to the foil layer 14 or to the layer 16b. The additional information 22 and the signature 23 can be applied using known techniques, for example printing technologies like lithography or screen printing, using a laser, embossing, re-transfer, inkjet, and combinations thereof.

After the photograph 20, information 22 and signature 23 have been applied, a protective layer 24 can be laminated to the layer 16b (and optionally over the layer 16a) to protect against forgery and abrasion. The protective layer 24 can be made of a material, for example polyester, that renders the layer 24 generally clear or translucent to permit substantially unobstructed, unaltered viewing of the window area 18, photograph 20, information 22 and signature 23 over which it is laminated.

The thus created card 10 has the same characteristics of a traditional security card and, dependent on the material that has been chosen to form the card, can be used for the same period of time as a traditional card made of the materials.

The shadow image 12 is created in the foil 14 in the window area 18 using a laser. The shadow image 12 is, for example, a monochromatic version of the photograph 20 that is created using the data used to form the photograph 20 in a known manner. The laser that is used is the same that is currently used for the personalisation of documents like identification cards and passports, ranging from 5-30 watts.

Figure 4:
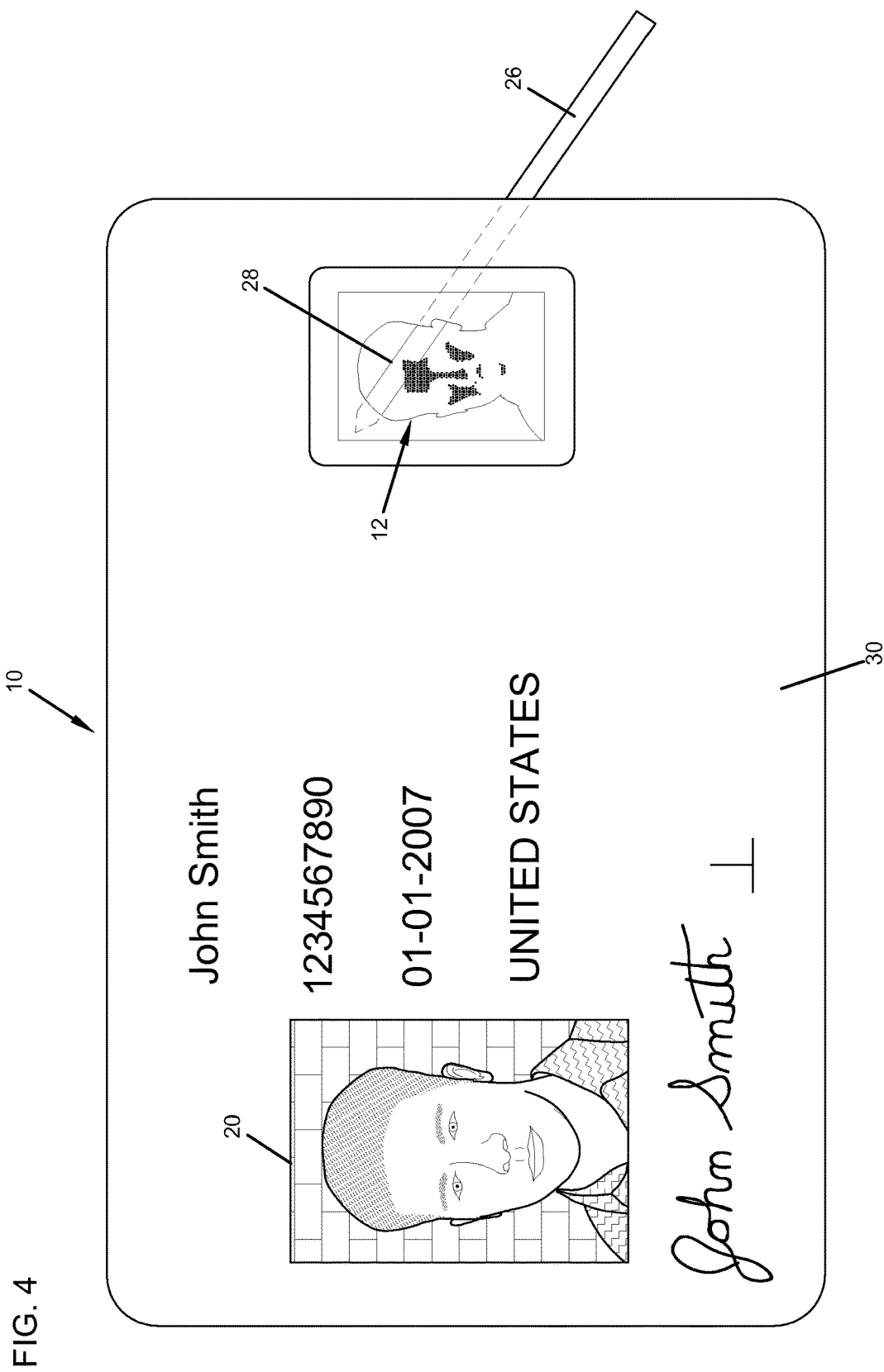
FIG. 4 is a view similar to FIG. 1 depicting the transparency of the shadow image security feature.

When the laser image is created in the window area 18, the laser ablates the foil 14 and creates the shadow image 12 that can be viewed in natural light. Where the image 12 is created, the foil 14 becomes transparent which allows one to see through portions of or the entire image 12. This is illustrated in FIG. 4 which depicts the shadow image 12 as it would appear when the card is held up against a lighter background or light source. The transparency of the image 12 then becomes evident, which is depicted by a pointer 26 that is disposed behind the card and the shadow image 12, where a portion 28 (in solid lines) of the pointer 26 behind the image 12 is visible through the image on the other side of the card 10. In portion of the window area 18 where the image is not located, the pointer 26 is not visible, as depicted by the broken line portions of the pointer in the window area 18.

Figure 3:
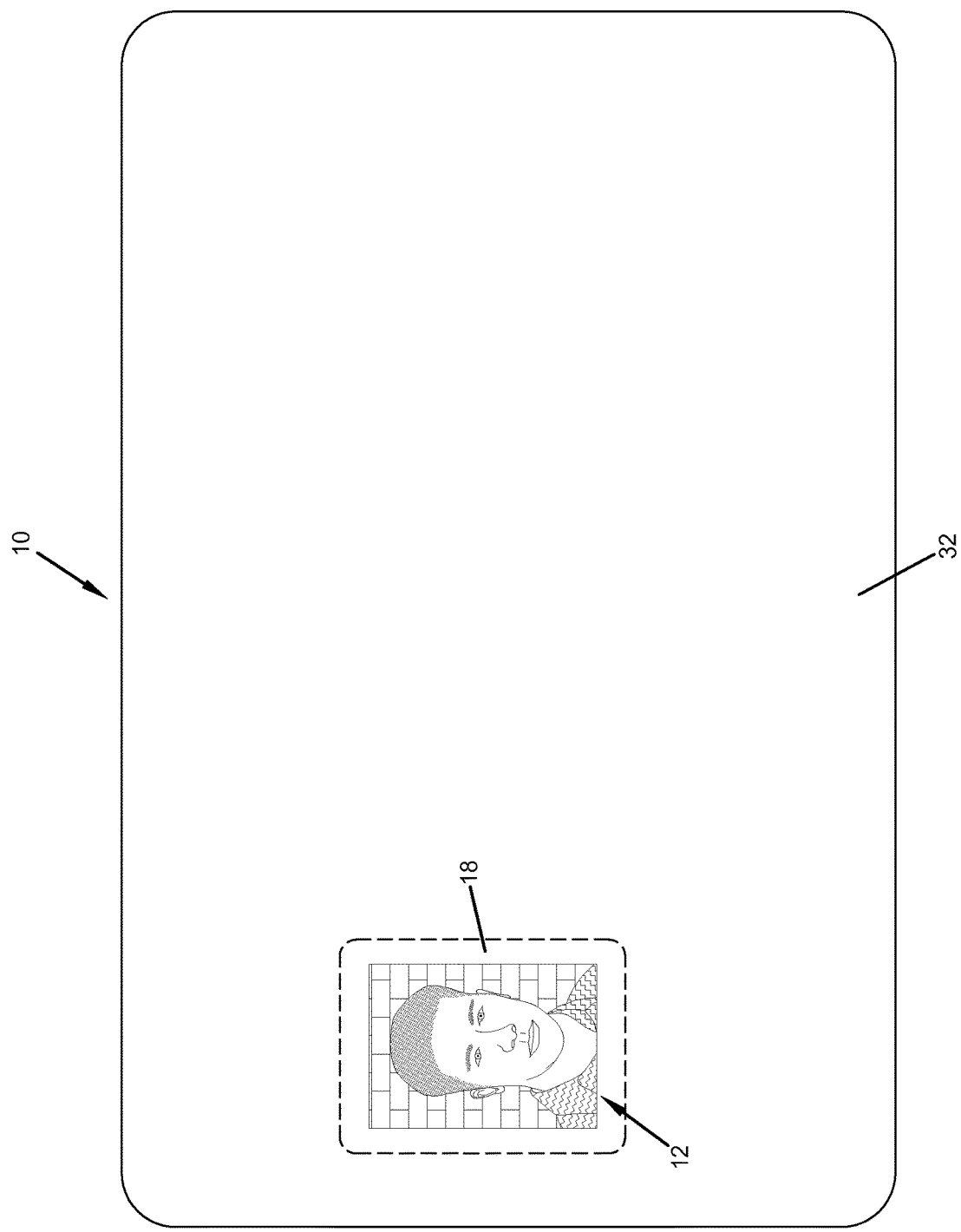
FIG. 3 is a view of the rear side of the identification document of FIG. 1.

In addition, the image 12 is visible on both sides of the card, with the normal image visible from a front side 30 as shown in FIG. 1 and the reverse of the image 12 visible from a rear side 32 of the card as shown in FIG. 3. When a standard metalized foil is used the transparent effect of the image 12 is clear. However, when a holographic metalized foil is used, the holographic effect is visible in the transparent part of the image.

The image 12 when viewed against a darker background looks like a normal image. However, as depicted in FIG. 4, when the card 10 is held against a lighter background or light source, for example natural light or a light bulb, the image 12 shows up as a negative or shadow image. The transparent effect of the image 12 then also becomes visible. The shadow image 12 can be combined with shadow text elements like name or date of birth or the unique number of the card, which can add to the security of the card.

The shadow image 12 offers a first line security feature that can be checked by non forensic experts without the use of special tools or techniques, which makes this security feature suitable for large scale use in secure document applications.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A security document comprising:
   a core;
   a portrait image of an intended holder of the security document applied to the core, the portrait image is visible on the security document;
   a window area in the core, the window area includes a metalized foil layer disposed between two transparent layers;
   a laser ablated image formed in the metalized foil layer in the window area, the laser ablated image is separate from the portrait image, the laser ablated image is of the intended holder of the security document, the laser ablated image being transparent, and the laser ablated image is visible from a front of the security document and visible from a rear of the security document.

2. The security document of claim 1, wherein the security document is an identification card or a passport.

3. The security document of claim 1, further comprising additional information on the document at a location spaced from the window area.

4. The security document of claim 3, wherein the additional information comprises one or more of a name, unique document number, birth date, citizenship, and a signature.

5. A security document comprising:
   a visible portrait image of an intended holder of the security document;
   a window area spaced from the portrait image, the window area includes a metalized foil layer;
   a laser ablated image of the intended holder of the security document formed in the metalized foil layer in the window area, the laser ablated image is separate from the portrait image, the laser ablated image is visible and is formed by transparent areas in the foil layer resulting from metal being removed from the metalized foil layer by a laser; and
   a transparent protective layer covering a top of the window area.

6. The security document of claim 5, wherein the security document is an identification card or a passport.

7. The security document of claim 5, further comprising a second transparent protective layer covering a bottom of the window area.

* * * * *